US010762531B2

(12) United States Patent
Feldman et al.

(10) Patent No.: US 10,762,531 B2
(45) Date of Patent: Sep. 1, 2020

(54) COMPUTER IMPLEMENTED CUING SYSTEM FOR DISPLAYING ADVERTISEMENT THROUGH AN INTERACTIVE COMPUTER BASED APPLICATION

(71) Applicants: Barbara Feldman, Dayton, OH (US); Todd Gorton, Englewood, OH (US)

(72) Inventors: Barbara Feldman, Dayton, OH (US); Todd Gorton, Englewood, OH (US)

( * ) Notice: Subject to any disclaimer, the term of this patent is extended or adjusted under 35 U.S.C. 154(b) by 0 days.

(21) Appl. No.: 14/862,061

(22) Filed: Sep. 22, 2015

(65) Prior Publication Data
US 2017/0083947 A1 Mar. 23, 2017

(51) Int. Cl.
*G06Q 30/00* (2012.01)
*G06Q 30/02* (2012.01)

(52) U.S. Cl.
CPC ..... *G06Q 30/0264* (2013.01); *G06Q 30/0267* (2013.01); *G06Q 30/0269* (2013.01)

(58) Field of Classification Search
CPC .............. G06Q 30/02; G06Q 30/0226; G06Q 30/0255; G06Q 30/0207; G06Q 30/0233; Y10S 707/99936
See application file for complete search history.

(56) References Cited

U.S. PATENT DOCUMENTS

| | | | | |
|---|---|---|---|---|
| 8,631,356 B2* | 1/2014 | Lai | ..................... | G06Q 30/0251 715/835 |
| 9,278,282 B2* | 3/2016 | Knutsson | ................ | G07F 17/32 |
| 2009/0018920 A1* | 1/2009 | Lerman | .............. | G06Q 30/0277 705/14.66 |
| 2012/0054015 A1* | 3/2012 | Wu | ........................ | G06Q 30/02 705/14.27 |
| 2012/0310750 A1* | 12/2012 | Schutzbank | ........... | G06Q 30/02 705/14.72 |

OTHER PUBLICATIONS

Yephi Berhanu, Build a Countdown Timer in Just 18 Minutes, Aug. 28, 2015, SitePoint Pty Ltd. (Year: 2015).*
Jamie Munro, Java Script—Easy Creation of Countdown Timers, May 10, 2015, CodeProject (Year: 2015).*
Pure JavaScript Countdown, www.youtube.com, Oct. 11, 2013, codecourse, https://www.youtube.com/watch?v=a6zN29Yk5FU (Year: 2013).*
Colleen Lopez Cracks Up Laughing on HSN Live TV, Jan. 31, 2008, HSN (Year: 2008).*
Abraham Chaffin, Full Page Overlay Window, 2008, CreativeCOW. net (Year: 2008).*
Kayla Knight, Opacity and Overlay Techniques in Web Design, May 9, 2011, OneExtraPixel.com (Year: 2011).*
Brandon Widder, How to Get More Lives in Candy Crush, Aug. 5, 2013, DigitalTrends.com (Year: 2013).*

* cited by examiner

Primary Examiner — Naresh Vig
(74) Attorney, Agent, or Firm — R. William Graham

(57) ABSTRACT

A computer-implemented cuing system for displaying advertisement through an interactive computer based application includes providing an interactive computer based application on a first computer based device and providing a cuing software operably associated which provides a predetermined use countdown of the interactive computer based application where upon reaching an end point of the predetermined use countdown initiates a realtime streaming for a predetermined time of a first video advertisement for presentation on the first computer based device.

10 Claims, 3 Drawing Sheets

COMPUTER IMPLEMENTED CUING SYSTEM FOR DISPLAYING ADVERTISEMENT THROUGH AN INTERACTIVE COMPUTER BASED APPLICATION

BACKGROUND OF INVENTION

Field of Invention

The invention generally relates to the field of computer interactive applications. More particularly, the invention relates to free mobile interactive applications for mobile devices and system of delivering advertising.

Prior Art

Although television is one of the mainstream advertising mediums and continues to lead many other advertising forms by generated revenue. More recent forms of advertising include on-line video and internet protocol television (IPTV).

It is understood that getting good impressions requires a viewer read or view the advertisement in its entirety with an open mind. It is also important that the views be targeted by viewers who will like the items shown in the advertisement.

SUMMARY OF INVENTION

It is an object to improve operation of free interactive applications.

Another object is to improve user experience of free mobile applications.

Still another object is to improve systems for controlling advertising delivery.

Yet another object is to reduce irritation to applications, particularly free applications, by providing the user with an expected level of uninterrupted use.

Accordingly, an aspect of the invention is directed to a computer-implemented cuing system for displaying advertisement through an interactive computer based application. The system includes providing a computer based application, which is typically interactive, for example, well known Candy Crush® or MineCraft®, on a first computer based device and providing a cuing software operably associated with the interactive computer based application. The cuing software provides for a predetermined use countdown of the interactive computer based application, where the cuing software analyzes the countdown through at least one processor and upon reaching an end point of the predetermined use countdown the cuing software initiates a realtime streaming for a predetermined time of a first video advertisement for presentation on the first computer based device.

The first computer based device can be a mobile computer based device. The predetermined use countdown can be time based or based on unit of interaction with the interactive computer based application, such as a swipe or operative touch of the screen of the application.

The cuing software can reset a predetermined use countdown subsequent to the streaming of the first video advertisement. The computer-implemented cuing can include a server operably associated with the cuing software for realtime streaming of one or more video advertisement for presentation on the first computer based device subsequent to the end point of the predetermined use countdown. It is also contemplated that the cuing software can dynamically manipulate the predetermined use countdown as a function of the predetermined time of the first video advertisement.

The invention describes techniques for providing a more acceptable manner for presenting advertising material to viewers, particularly of free application software. By permitting a viewer to control when he/she sees a known upcoming advertisement, it is believed that a higher percentage of views of the same will occur and thus provide for less agitation to the viewer and more effective advertising campaigns. Additionally, the cuing software can be equipped with the ability to monitor interactions with particular advertisements and conversions (e.g., where the user jumps to a site in the ad). In this regard, the streamed advertisements can be tailored from the server to meet the viewer's profile. The system can include a commercial database containing a plurality of commercials associated with one or more commercial parameters, an advertising server configured to select commercials for display on the computer based device and to determine when commercials have been interacted with by the user, such as entering a hypertext link on the ac and is equipped to update a demographic profile corresponding to a user or a commercial based on activity of the user.

These and other features of the invention will become apparent from viewing the drawings and detailed description hereinafter.

DETAILED DESCRIPTION OF PREFERRED EMBODIMENT

Figure 1:
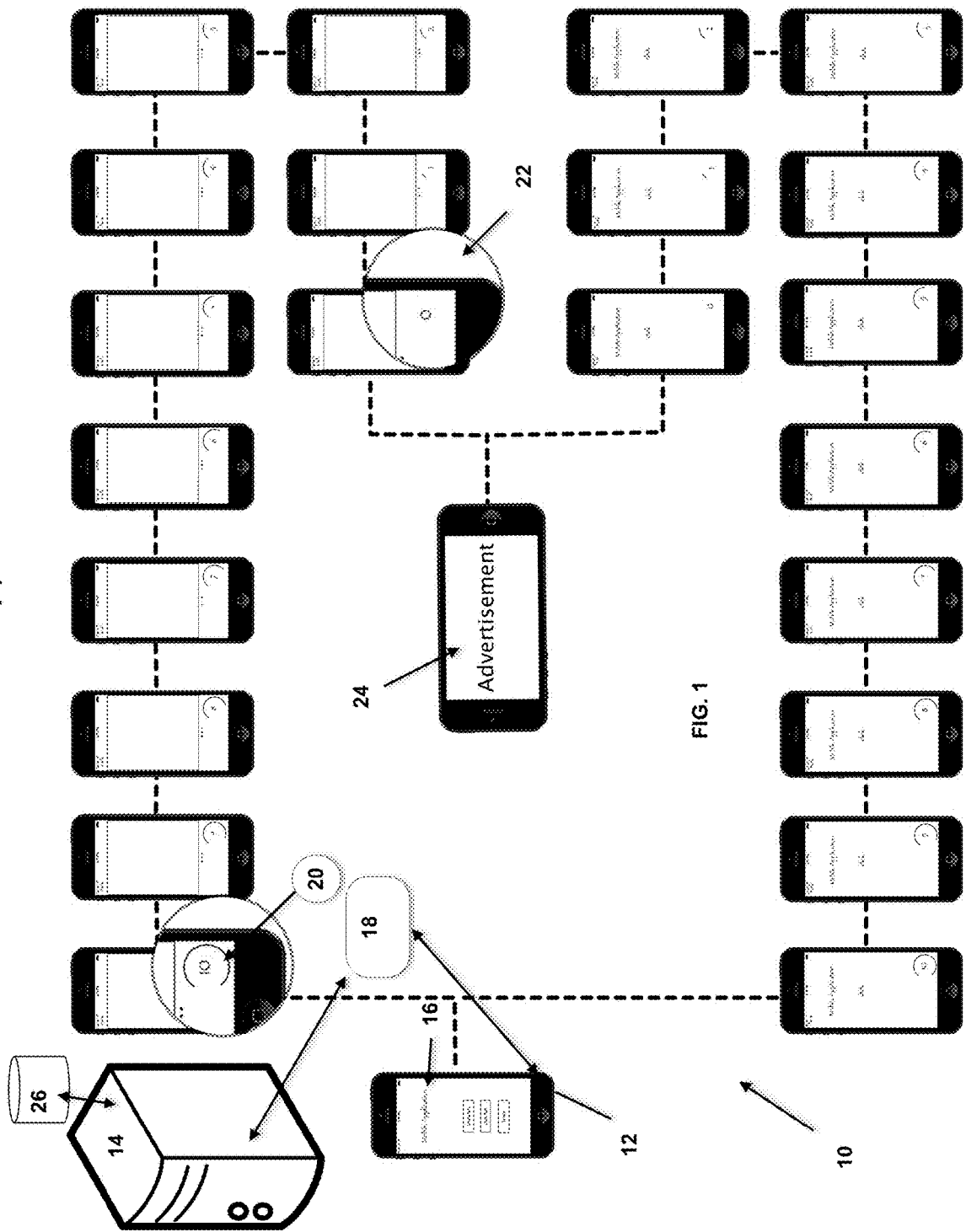
FIG. 1 is a diagram of an embodiment of the system according to the invention.

Referring to the drawings, like reference numerals in the various drawings indicate like elements. The computer-implemented cuing system of the instant invention is generally depicted by the numeral 10.

The computer-implemented cuing system 10 can preferably include a user computer based device 12, such as mobile smart phone, tablet, laptop or desktop computer and in the instant invention by way of example is shown as a mobile smart phone. A server computer 14 can be operably associated with the user computer based device 12 by way of the Internet or telecommunication network, for example.

The server computer 14 and user computer based device 12 includes hardware, e.g., processor, memory, and operating software. The user computer based device 12 includes one or more computer based application 16 for running and being displayed on the user computer based device 12. The computer based application 16 can preferably be and interactive application which requires some user screen interface, e.g. touch screen. For example, the computer based application 16 can be a game such as well known Candy Crush® or MineCraft®.

Operably associated with the first computer based device 12 and server 14 is provided a cuing software 18 which is operably associated with operating software on the interactive computer based application 16. The cuing software 18 provides a predetermined use countdown 20 of the interactive computer based application 16, where the software 18 analyzes the countdown through at least one processor and upon reaching an end point 22 of the predetermined use countdown the cuing software 18 initiates a realtime streaming for a predetermined time of a first video advertisement 24 for presentation on the first computer based device 12.

The first computer based device 12 can be a mobile computer based device as seen in the Figures. The predetermined use countdown 20 can be time based (as illustrated in a top half of FIGS. 1 and 2) or based on unit of interaction with the interactive computer based application 16, such as a swipe or operative touch of the screen of the application 16 (as illustrated in a bottom half of FIGS. 1 and 2).

The cuing software 18 can reset a predetermined use countdown 20 subsequent to the streaming of the first video advertisement 24. The server 14 is operably associated with the cuing software 18 for realtime streaming of one or more video advertisement 24 for presentation on the first computer based device 12 subsequent to the end point 22 of the predetermined use countdown 20. It is also contemplated that the cuing software 18 can dynamically manipulate the predetermined use countdown 20 as a function of the predetermined time of the first video advertisement 24.

The invention describes techniques for providing a more acceptable manner for presenting advertising material to viewers of free application software. In general, by permitting a viewer to control when he/she sees a known upcoming advertisement, it is believed that a higher percentage of views of the same will occur and thus provide for less agitation to the view and more effective advertising campaigns. Additionally, the cuing software 18 can preferably be equipped with the ability to monitor and analyze interactions with particular advertisements 24 and conversions, i.e., where the user interacts with the advertisement 24. In this regard, the streamed advertisements can be tailored from the server 14 to meet the viewer's profile, The system 10 can include a commercial database 26 containing a plurality of commercial and advertisements associated with one or more interactive parameters, such as a hyperlink. The advertising server 14 can be configured to select commercials for display on the computer based device 12 and to determine when commercials have been interacted with by the user and is equipped to update a demographic profile corresponding to a user or a commercial based on activity of the user.

Figure 2:
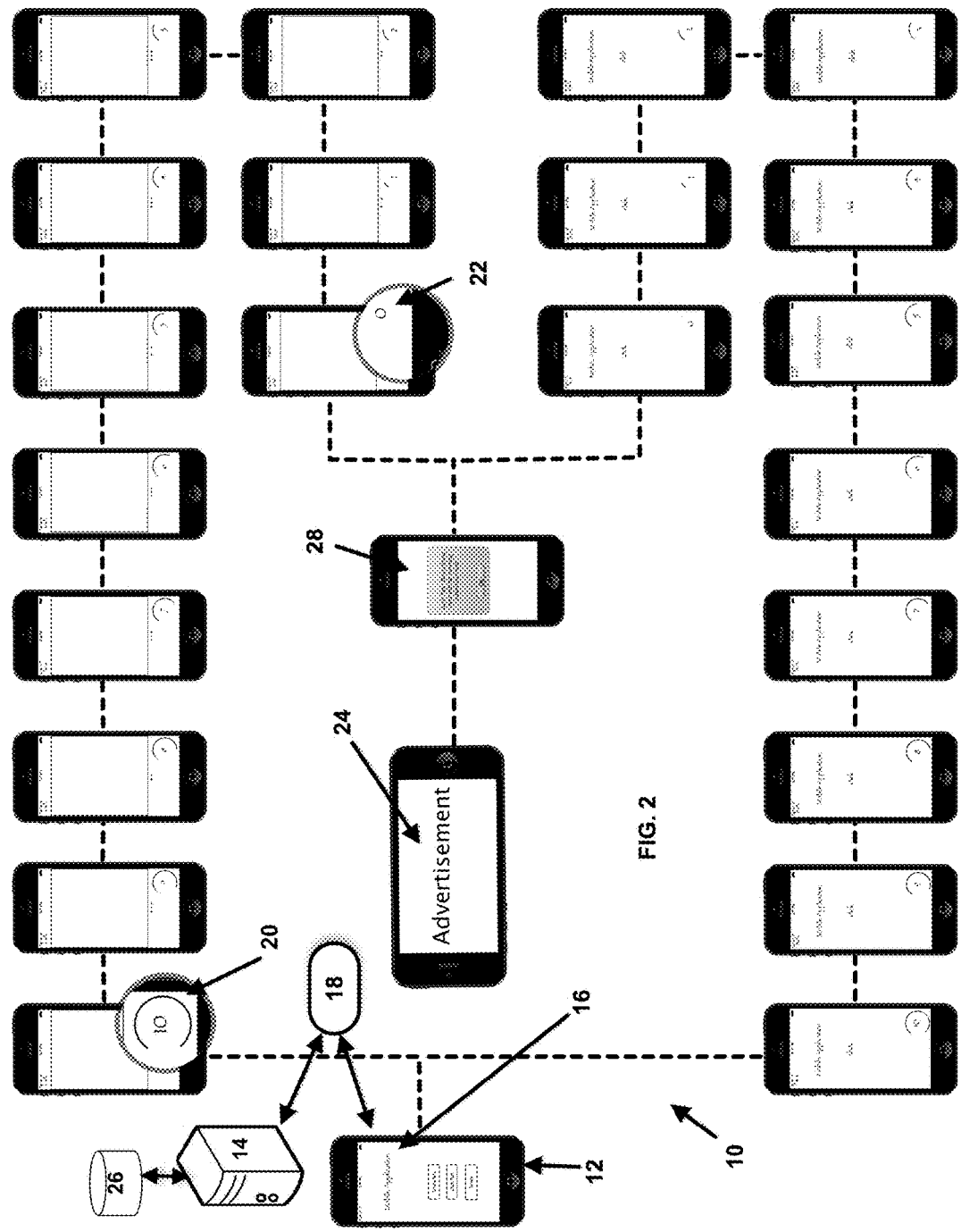
FIG. 2 is a diagram of another embodiment of the system according to the invention.
Figure 3:
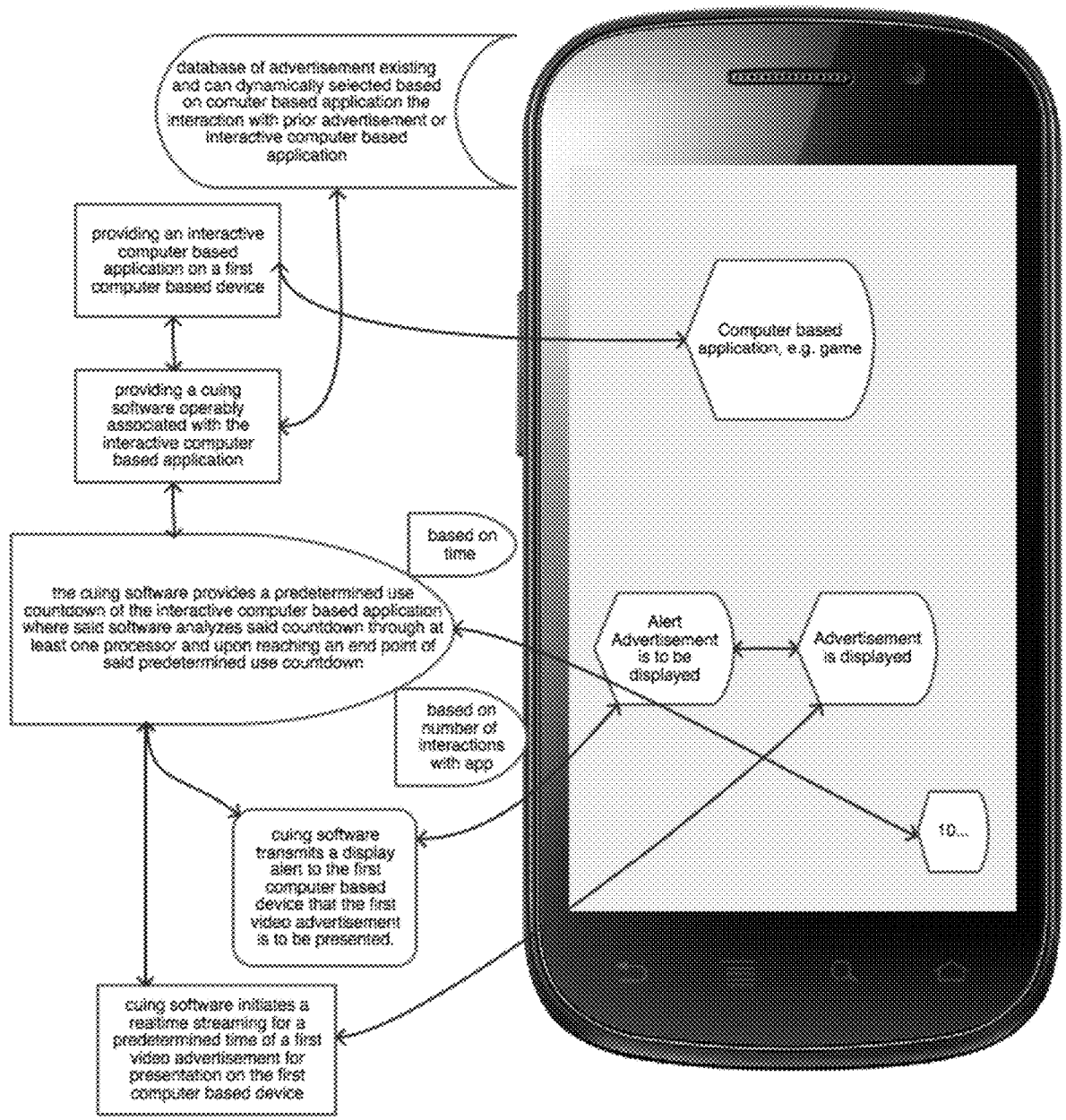
FIG. 3 is a flow chart of an example of a method of operations for a system according to the invention.

In general, FIG. 1 shows an operation of the invention wherein the user is provided an advertisement 24 subsequent to reaching end point 20. FIG, 2 shows an operation with an additional step 28 provided as an option in the cuing software 18 which alerts the user as to the advertisement to be viewed prior to interacting further in the application 16. It is envisioned that the cuing software 18 can incorporate other features, such as an accept, a skip or otherwise reject option as to the advertisement.

Based on the user's behavior with respect to the earlier commercials, e.g., interacting, watching, skipping or rejecting them, the system 10 may select advertisements 24 in the database 26 to add to the queue to show the user. The selected advertisements will have one or more features in common with advertisements that the user watched, and the rejected advertisements will have features unlike the advertisements that the user watched and/or similar to those advertisements the viewer skipped or rejected.

The advertisements 24 may be in the form of standard video, banner graphic, and/or or audio formats, for example. The characteristics tracked by the system 10 can be directed to a variety of items, such as type of goods, services, or ad type itself. Interaction with the advertisement can include the cuing software 18 providing a rating mechanism.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment. Suitable processors for the execution of a program of instructions include, by way of example, both general and special purpose microprocessors, and the sole processor or one of multiple processors of any kind of computer. A processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits). To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. Moreover, other mechanisms for presenting a user with test case information may be used. In addition, the logic flows depicted in the figures do not require the particular order shown, or sequential order, to achieve desirable results.

Other steps may be provided, or steps may be eliminated, from the described flows, and other components may be added to, or removed from, the described systems. Accordingly, other implementations are within the scope of the following claims.

What is claimed is:

1. A computer-implemented cuing system for displaying advertisement through an interactive computer based application, comprising:

a first interactive computer based device having a user screen interface configured to display a user interface including one or more selectable displayed application pages, each of the one or more selectable displayed application pages displaying one or more visual elements; and wherein said first interactive computer based device includes interactive computer based application and a complementary cuing software operably associated with said interactive computer based application; a memory that stores computer-readable instructions; and a processor configured to execute the computer-readable instructions to: determine, by using one or more sensors, that an application user, of the computer-based device, is interacting with the screen; and a display a timer, as a persistent overlay, on at least a portion of each of the one or more selectable displayed application pages, the timer being indicative of a time duration time remaining of the application user's interaction before being interrupted by a video advertisement, wherein at least one of the visual elements, overlaid by the timer, remains viewable and accessible by the application user of the computer-based device, and wherein said complementary cuing software provides a visual predetermined use countdown of said interactive computer based application as a function of said one or more sensors sensing a screen swipe and operative touch as increments of use on said user screen and said countdown is paused during non-use through monitored user interaction, said countdown indicative of an upcoming first video advertisement where said cuing software analyzes said one of a screen swipe and operative touch on said user screen providing said countdown through said processor and upon reaching an end point of said predetermined use countdown communicates with said cuing software on a server to initiate a realtime streaming of said first video advertisement from said server fora predetermined time on said first computer based device user screen interface while using the interactive computer based application; and an interactive server computer having cuing software for initiating realtime streaming of at least one video advertisement based on an interaction countdown data being received.

2. The computer-implemented cuing system of claim 1, wherein said first interactive computer based device is a mobile computer based device.

3. The computer-implemented cuing system of claim 1, wherein said predetermined use countdown is time based.

4. The computer-implemented cuing system of claim 3, wherein said cuing software transmits a display alert to said first computer based device that said first video advertisement is to be presented.

5. The computer-implemented cuing system of claim 3, wherein said cuing software transmits a display alert to said first interactive computer based device that said first video advertisement is to be presented.

6. The computer-implemented cuing system of claim 1, wherein said predetermined use countdown is based on unit of interaction with said interactive computer based application.

7. The computer-implemented cuing system of claim 1, wherein said cuing software resets a predetermined use countdown subsequent to said streaming of said first video advertisement.

8. The computer-implemented cuing system of claim 7, wherein said cuing software monitors interaction with said first video advertisement and streams a second video advertisement based on said interaction.

9. The computer-implemented cuing system of claim 1, which includes a server operably associated with said cuing software for realtime streaming of one or more video advertisement for presentation on said first computer based device subsequent to said end point of said predetermined use countdown.

10. The computer-implemented cuing system of claim 1, wherein said cuing software dynamically manipulates said predetermined use countdown as a function of said predetermined time of said first video advertisement.

* * * * *